June 29, 1926. 1,590,709
R. L. TAYLOR
FLAX PULLING MACHINE
Filed March 24, 1922
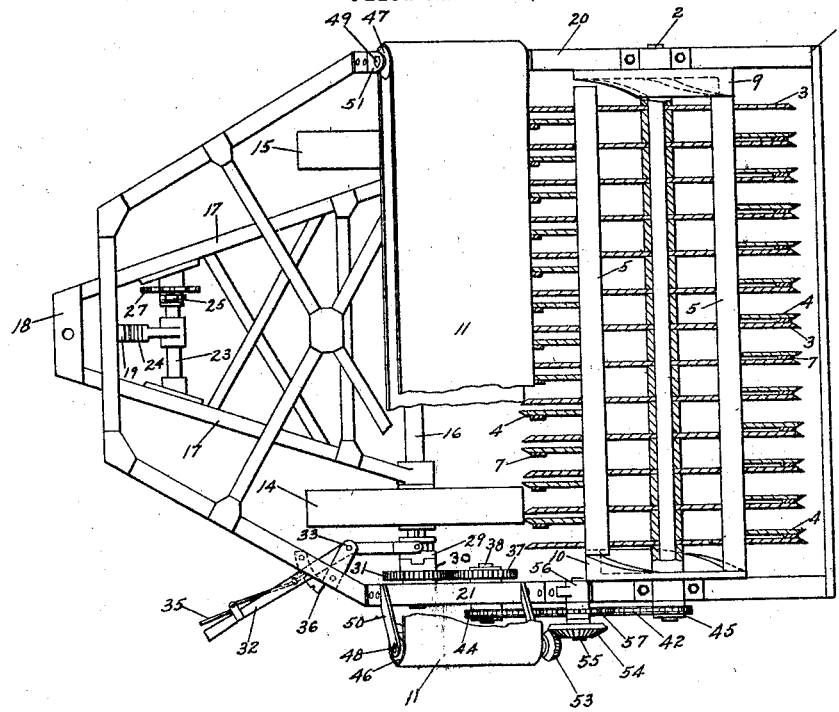
Fig. II
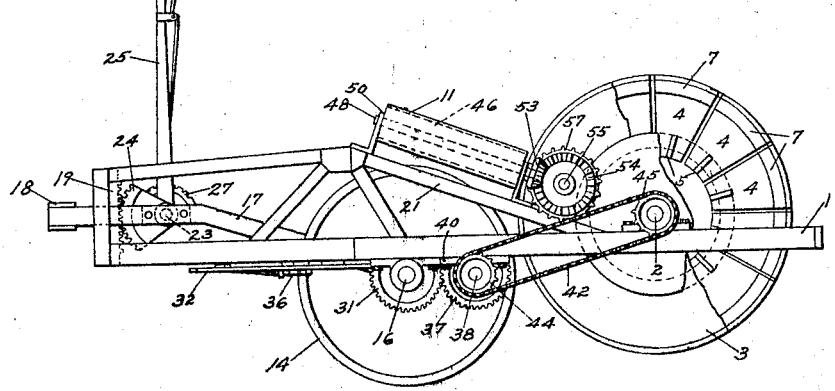
Fig. I
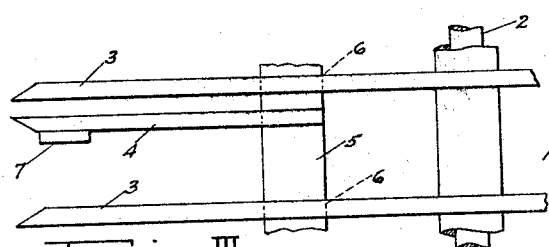
Fig. III
INVENTOR:
Robert L. Taylor,
By
Atkins & Atkins,
ATTORNEYS.

Patented June 29, 1926.

1,590,709

UNITED STATES PATENT OFFICE.

ROBERT L. TAYLOR, OF PORTLAND, OREGON.

FLAX-PULLING MACHINE.

Application filed March 24, 1922. Serial No. 546,312.

My invention relates to the art of pulling or eradicating standing flax from the field, and has for its object the production of a machine for performing economically that work whose recognized necessity in the art is assumed to be understood, and which has been heretofore done by hand at comparatively great cost.

What constitutes my invention will be hereinafter specified in detail and succinctly set forth in the appended claims.

In the accompanying drawing:

Figure I is a side elevation, partly broken away, of my invention, in present preferred form of embodiment.

Figure II is a top plan view of the same, partly broken away and also, for the sake of clearness, reduced to a showing of only two rows of flax grippers, one partly open and one closed, instead of the numerous rows thereof with which a practically operative machine is equipped.

Figure III shows in edge view and on enlarged scale the respective halves of the two next adjacent disks in a row of grippers, and between the disks a sector that cooperates with one of the disks to constitute therewith a gripping element.

Referring to the numerals on the drawing, 1 indicates a metallic frame that may be made of any preferred shape and dimensions and of any preferred method and design of construction that may contribute to it requisite rigidity.

The frame is made chiefly as a carriage for the operative accommodation of a transverse shaft 2 whose ends are rotatively mounted in suitable boxes provided for it in said frame. The shaft 2 carries at suitable equal intervals along its length a number of disks 3 that are keyed or otherwise fixed to it, the number being proportionate to the size of the machine and the length of its said shaft. Cooperative and rotative with each disk is a ring of independent juxtaposed gripping members 4 preferably designed and made in the form of truncated sectors each of which is combined with its disk 3 to constitute a gripping element. The gripping members hereinafter called sectors are preferably made of stiffly resilient steel and are aligned in rows of grippers which operate simultaneously to take hold upon a row of flax stalks and then to lift them, with a gentle pull, from the ground in which they grew. The number of rows of sectors is made sufficient to enable them collectively and at a moderate rate of speed of movement to take up all stalks of flax that present themselves to the operation of the machine in its operative travel over a field.

The alignment of the sectors into rows as aforesaid is preferably accomplished by a bar 5 for each row. The bars 5 reciprocate, respectively, in aligned apertures 6 in the series of disks 3 to which they are snugly fitted, and are adapted to move with and to be actuated by the rotation of the disks.

The bars 5 are caused successively to reciprocate through their bearing apertures 6 a sufficient distance to cause the sectors 4 in their lateral motion in one direction, to separate a predetermined distance from their appropriate disks 3, and by their lateral motion in the opposite direction to cause the sectors to clamp each against its disk with gripping effect. To that end I prefer to provide each sector with an arcuate gripping plate 7 that is preferably made of yielding material, for example leather or india rubber, and which is disposed near the outer edge of each sector, concentrically to the shaft 2.

The means for actuating the bars 5 which I prefer, at present, to employ, consist simply of two cams 9 and 10 in which the cam action of one is complementary to that of the other, to the extent of holding the bars substantially fixed against longitudinal movement except at such intervals as those at which it is desired to impart such movement to them. Accordingly the cams are fixed to the frame 1 adjacent to opposite ends of the shaft 2, and are as cams operatively disposed in opposite directions as shown in Figure II. By reason of the snub engagement or wiping of the ends of the bars 5 against the said cams, respectively, the bars are caused, at predetermined intervals, to shift their positions, one after another, back and forth in a longitudinal direction, the cam 9 serving to move each bar in one direction and the cam 10, upon release by the cam 9, serving to reverse said movement. The timing of the intervals of the said movements of the bars 5 is determined by the gripping function required of the sectors 4. That is to say, each sector of each row of sectors should separate from its disk each time they are, by rotation of the disks, brought into operative propinquity to the standing stalks of flax, or, in other words, just about the time when the forwardly advancing radial edge of each reaches substantially the vertical position below the shaft 2. Afterwards they should close upon and grip an intake of stalks just before the next row of sectors is, by the continued rotation of the disks 3, advanced to repeat the stalk-gripping operation just described. It may be observed here that some latitude of adjustment and of timing of the operation of the elements described is both permissible and desirable, for reasons that are believed to be obvious.

After the sectors of a row of sectors grip the stalks, they hold them until they are purposely released for delivery discharge, with the effect, during the interval, through continued rotation of the shaft 2 and its appurtenant members, of gently pulling so many of the plants of flax as are segregated by the operation of the rows of sectors into what may be designated as a swath.

The delivery discharge of the flax relatively to the rotation of the disks 3, by the separation of the sectors from their respective disks, may be fixed at will. It may be effected in part by the construction of the machine and in part by adjustment of its parts. In the machine illustrated, delivery is made after the sectors pass the vertical line above the shaft 2, in order that when they are released the plants will drop by gravity upon an endless conveyor belt 11 that is operatively disposed in substantially medial relationship to the frame 1. In Figure II, the sectors of the row of grippers on the right hand side are shown as fully closed against their respective disks, while those on the left hand side, to wit, upon the opposite side of the disks, are shown as not altogether open.

The frame 1 is in use movably supported as upon wheels 14 and 15, mounted upon a shaft 16 rotatively secured to the frame. A pair of hounds 17 united at one end as by a cross-head 18 and at the other end to the shaft 16, serves for securing thereto a means of propulsion from behind, for example, a traction engine, not illustrated.

The frame 1 is preferably provided in the space between the cross-head 18 and the shaft 2 with a truss construction that embodies a rigid support for a vertical rack 19 and oblique struts 20 and 21. Between the hounds 17 and in suitable bearings therein, I provide a rock-shaft 23 to which is secured a spur geared segment 24, that meshes with the rack 19. By aid of a lever 25, a handle bar 26, and notched quadrant 27, all of familiar construction, rocking motion may be imparted to the shaft 23 and thereby desired adjustments may be secured. By that means, assuming the cross-head 18 to be in fixed horizontal position by connection to a tractor as aforesaid, the frame 1 may, within determinate limits, be tilted upon the shaft 16 at any desired angle, with the effect of adjusting the height above ground of the disks 3 that are disposed upon the shaft 2 with collective cylindrical effect as illustrated in Figure 1. Thereby, I provide means for adjusting the machine to suit various inequalities of the land on which the flax grows, and to take hold of the flax plants at variable heights above ground.

The functional operation of the machine is preferably derived from one of the wheels which carry it. Wherefore, the wheel 14, denominated a bull-wheel, is splined or otherwise fixed to the shaft 16. Also splined thereto is one-half 29 of a clutch member whose complementary half 30 carries a spur gear 31, and is actuated into and out of clutch as by an ordinary clutch-lever 32 pivoted at 33 to the frame 1 to which it is made adjustable as by means of a usual handle 35 working to and from a notched quadrant 36.

The gear 31 meshes with a gear 37 secured to the inner end of a rotative shaft 38 that is mounted in a box 40 provided for it on the frame 1. Outside of the frame 1, a gear, preferably a sprocket gear 44, is fixed to the shaft 38, and is geared, as by a sprocket chain 42, with a corresponding gear 45 fixed to the adjacent end of the shaft 2 that projects outside the frame 1. The shaft 2 may thus, at the will of the operator, be made to derive rotative motion from the bull-wheel 14.

By the aid of the said wheel, motion may also be communicated to the conveyor belt 11 in the manner illustrated in the drawing, wherein said belt is shown as stretched with operative tautness about rollers 46 and 47 whose respective axles 48 and 49 are journaled in boxes disposed in pairs 50 and 51 upon the struts 20 and 21, respectively. The obliquity of said struts disposes the belt 11 at an angle favorable to the reception of the flax from the gripper. The axle 48 is extended at one end through and beyond one of its boxes 50 to accommodate a bevel gear 53 that is fastened to the outer end of it. The gear 53 meshes with a bevel gear 54 that is journaled in a box 56 provided for it upon the frame 1. Between the gear 54 and the box 56, the shaft 55 carries a sprocket gear 57 that operatively engages the sprocket chain 42 and through it derives motion, in the manner already described, from the bull-wheel 14.

The foregoing specification is believed to be sufficiently full and complete in itself to render further description of the operation of my machine unnecessary.

What I claim is:

1. A flax pulling machine comprising in

-combination a rotatable set of spaced coaxial disks, a plurality of movable gripping members mounted between said disks and aligned in rows, common means for each row of gripping members for successively opening and closing the same with clamping effect against the disks, and means for operatively presenting said disks and gripping members to flax growing afield.

2. A flax pulling machine comprising in combination a rotatable set of spaced coaxial disks, a plurality of gripping members mounted between said disks and disposed in rows comprising one member for each disk, common means for each row for successively opening and closing the same with clamping effect of its individual members against their respective disks, and means for operatively presenting said disks and gripping members to flax growing afield, the former of said means being dependent for operation upon the latter.

3. A flax pulling machine comprising the combination with a carriage and a supporting wheel therefor, of a rotatable set of spaced coaxial disks, rows of gripping members cooperative with said disks, in operative communication, respectively, with said wheel, and means adapted, through rotation of said wheel, operatively to present said disks, and rows of gripping members to flax growing afield.

4. A flax pulling machine comprising the combination with a carriage, a supporting wheel therefor, and a rotatable horizontal shaft on said carriage, of a set of spaced coaxial disks on said shaft, respective rings of independent gripping members for each pair of adjacent disks, means for rigidly connecting individual members in each ring to form horizontally aligned movable rows of gripping members that are in operative communication, respectively, with said wheel, and means adapted through the rotation of said wheel, operatively to present said disks and an endless succession of said rows of gripping members to flax growing afield.

5. A flax pulling machine comprising the combination with a carriage, a supporting wheel therefor, and a rotatable horizontal shaft on said carriage, of a set of spaced coaxial disks on said shaft, respective rings of independent gripping members for each pair of adjacent disks, means for rigidly connecting individual gripping members in each ring to form successive horizontal rows of gripping members that are in operative communication, respectively, with said wheel, and operative means for successively actuating each row of gripping members to open and close it with clamping effect upon the disks once with each revolution of the said wheel.

6. A flax pulling machine comprising the combination with a carriage, a supporting wheel therefor and a rotatable horizontal shaft on the carriage operatively connected with said wheel, of a set of spaced coaxial disks fixedly mounted on said shaft, an endless series of transversely movable rows of gripping members cooperative with said disks to clamp and release swaths of flax, and means for successively effecting operative transverse movement of said rows of gripping members through rotation of said shaft.

7. A flax pulling machine comprising the combination with a carriage, a supporting wheel, and a rotative horizontal shaft on the carriage operatively connected with said wheel, of a series of rotative disks on said shaft, a series of transversely movable members cooperative with said rotative disks, respectively, with gripping effect, and means for effecting operative transverse movement of said movable members through rotation of said shaft, said means consisting of reciprocatory bars fixed to the individuals of a series of said movable members and working through bearing apertures provided for them in the rotative elements, and means for imparting reciprocatory movement in opposite direction to said bars through said rotation of said shaft.

8. A flax pulling machine comprising the combination with a carriage frame, a supporting wheel therefor, a horizontal shaft rotative on said frame, a series of disks disposed with collective cylindrical effect upon said shaft, cooperative transversely movable members arranged in series with respect to said disks, respectively, and means for operatively actuating said members, of a transverse endless conveyor in operative proximity and conformity to said cylindrical disposition of disks.

9. A flax pulling machine comprising the combination with a carriage frame, a supporting wheel therefor, a horizontal shaft rotative on said frame, a series of disks disposed with collective cylindrical effect upon said shaft, cooperative transversely movable members arranged in series with respect to said disks, respectively, and means for operatively actuating said members, of a transverse endless conveyor in operative proximity and conformity to said cylindrical disposition of disks, and means in operative connection with said supporting wheel for actuating said endless conveyor.

10. A flax pulling machine, comprising a pair of gripping elements and means for actuating them to open and close them with gripping effect when substantially in a vertical position, of means for imparting to said elements a vertical lifting motion after each gripping action in order to effect the flax pulling function required.

11. A flax pulling machine comprising in combination a rotatable set of spaced coaxial disks, a plurality of transversely movable gripping members mounted between said disks and aligned in rows, common means for successively opening and closing the same against the disks, means upon the working faces of the gripping members for effecting a yielding gripping action when closed against the disks, and means for operatively presenting said disks and gripping members to flax growing afield.

In testimony whereof I have hereunto set my hand.

ROBERT L. TAYLOR.